(12) United States Patent
Shigetomi

(10) Patent No.: US 12,523,956 B2
(45) Date of Patent: Jan. 13, 2026

(54) ELECTRONIC APPARATUS CAPABLE OF DETERMINING WHETHER TO EXECUTE POWER SUPPLY TO CONTROL PORTION AT START OF POWER SUPPLY FROM OUTSIDE

(71) Applicant: KYOCERA Document Solutions Inc., Osaka (JP)

(72) Inventor: Masayuki Shigetomi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/906,698

(22) Filed: Oct. 4, 2024

(65) Prior Publication Data

US 2025/0116957 A1    Apr. 10, 2025

(30) Foreign Application Priority Data

Oct. 6, 2023  (JP) ................................. 2023-174474

(51) Int. Cl.
*G03G 15/00* (2006.01)
*H02J 7/00* (2006.01)

(52) U.S. Cl.
CPC ......... *G03G 15/5004* (2013.01); *G03G 15/80* (2013.01); *H02J 7/0068* (2013.01); *G03G 2215/00983* (2013.01); *H02J 2207/10* (2020.01)

(58) Field of Classification Search
CPC ............... G03G 15/5004; G03G 15/80; G03G 2215/00983; H02J 7/0068; H02J 2207/10
USPC ..................................................... 399/37, 88
See application file for complete search history.

(56) References Cited

U.S. PATENT DOCUMENTS

| | | | | |
|---|---|---|---|---|
| 10,168,655 | B2 * | 1/2019 | Ishikawa ............ | G03G 15/5004 |
| 2007/0286631 | A1 * | 12/2007 | Koya .................... | G03G 15/80 |
| | | | | 713/320 |
| 2012/0092897 | A1 * | 4/2012 | Hara ...................... | H02J 9/005 |
| | | | | 363/16 |
| 2012/0104866 | A1 * | 5/2012 | Yoo ..................... | G03G 15/5004 |
| | | | | 307/86 |
| 2013/0026837 | A1 * | 1/2013 | Nozawa .................. | G06F 1/263 |
| | | | | 307/66 |
| 2013/0322898 | A1 * | 12/2013 | Koseki ................... | G03G 15/80 |
| | | | | 399/37 |
| 2014/0341603 | A1 * | 11/2014 | Fujiwara ............... | H02M 1/081 |
| | | | | 399/88 |

(Continued)

FOREIGN PATENT DOCUMENTS

JP            H11296265 A        10/1999

*Primary Examiner* — Robert B Beatty
(74) *Attorney, Agent, or Firm* — Alleman Hall & Tuttle LLP

(57) ABSTRACT

An electronic apparatus includes a control portion, a signal output circuit, a switching processing portion, and a determination processing portion. The control portion switches on or off power supply from the primary power source in response to detection of an operation on a power switch. The signal output circuit outputs a preset digital signal. The switching processing portion switches a signal level of the digital signal when a power supply state of the control portion is switched. The determination processing portion determines whether or not to execute power supply to the control portion based on the signal level of the digital signal output by the signal output circuit when power supply from an external power source to the primary power source is started.

3 Claims, 4 Drawing Sheets

(56) References Cited

U.S. PATENT DOCUMENTS

2021/0124411 A1* 4/2021 Tagami ................ G06F 1/3296
2021/0173470 A1* 6/2021 Kim ....................... H02J 9/005

* cited by examiner

ELECTRONIC APPARATUS CAPABLE OF DETERMINING WHETHER TO EXECUTE POWER SUPPLY TO CONTROL PORTION AT START OF POWER SUPPLY FROM OUTSIDE

INCORPORATION BY REFERENCE

This application is based upon and claims the benefit of priority from the corresponding Japanese Patent Application No. 2023-174474 filed on Oct. 6, 2023, the entire contents of which are incorporated herein by reference.

BACKGROUND

The present disclosure relates to an electronic apparatus.

In an electronic apparatus such as a multifunction peripheral, power supply to a control portion that controls the entire apparatus is switched on or off in response to detection of an operation on a power switch.

SUMMARY

An electronic apparatus according to one aspect of the present disclosure includes a primary power source, a control portion, a signal output circuit, a switching processing portion, and a determination processing portion. The primary power source receives power supply from an external power source. The control portion switches on or off power supply from the primary power source in response to detection of an operation on a predetermined power switch. The signal output circuit receives power supply from the primary power source and outputs a preset digital signal during power supply from the external power source to the primary power source, and receives power supply from a predetermined secondary power source and outputs the digital signal during power supply stop from the external power source to the primary power source. The switching processing portion switches a signal level of the digital signal when a power supply state of the control portion is switched. The determination processing portion determines whether or not to execute power supply to the control portion based on the signal level of the digital signal output by the signal output circuit when power supply from the external power source to the primary power source is started.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. It is noted that the following embodiment is an example of embodying the present disclosure and does not limit the technical scope of the present disclosure.

[Configuration of Image Forming Apparatus 100]

First, a configuration of an image forming apparatus 100 according to an embodiment of the present disclosure will be described with reference to FIG. 1 and FIG. 2.

The image forming apparatus 100 is a multifunction peripheral having a plurality of functions such as a facsimile function and a copy function in addition to a scan function for reading an image of a document sheet and a print function for forming an image on a sheet based on image data. The image forming apparatus 100 is an example of the electronic apparatus of the present disclosure. It is noted that the present disclosure is applicable to electronic apparatuses such as scanners, printers, fax machines, copiers, personal computers, notebook computers, smartphones, tablet terminals, televisions, air conditioners, refrigerators, and washing machines.

Figure 1:
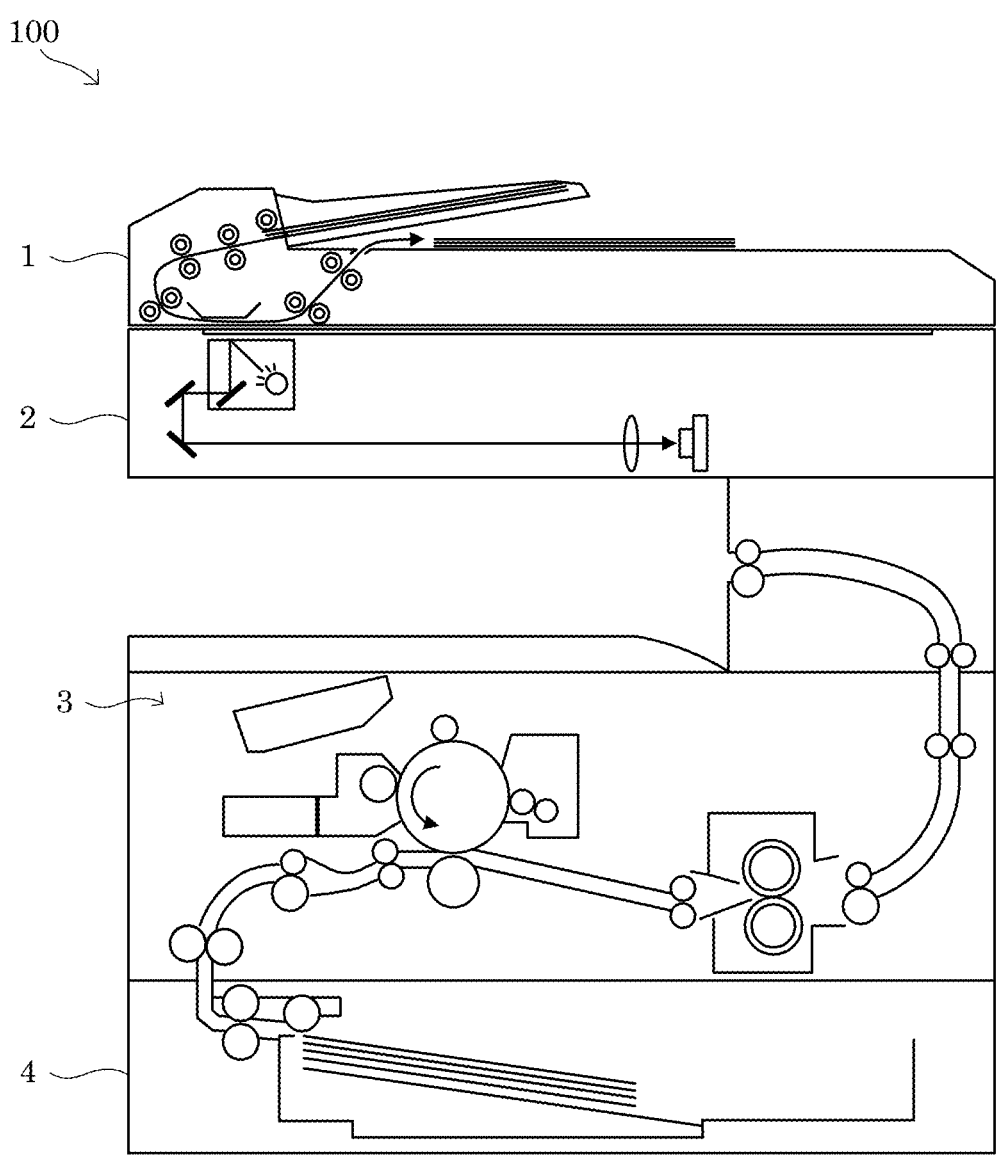
FIG. 1 is a cross-sectional view showing a configuration of an image forming apparatus according to an embodiment of the present disclosure.
Figure 2:
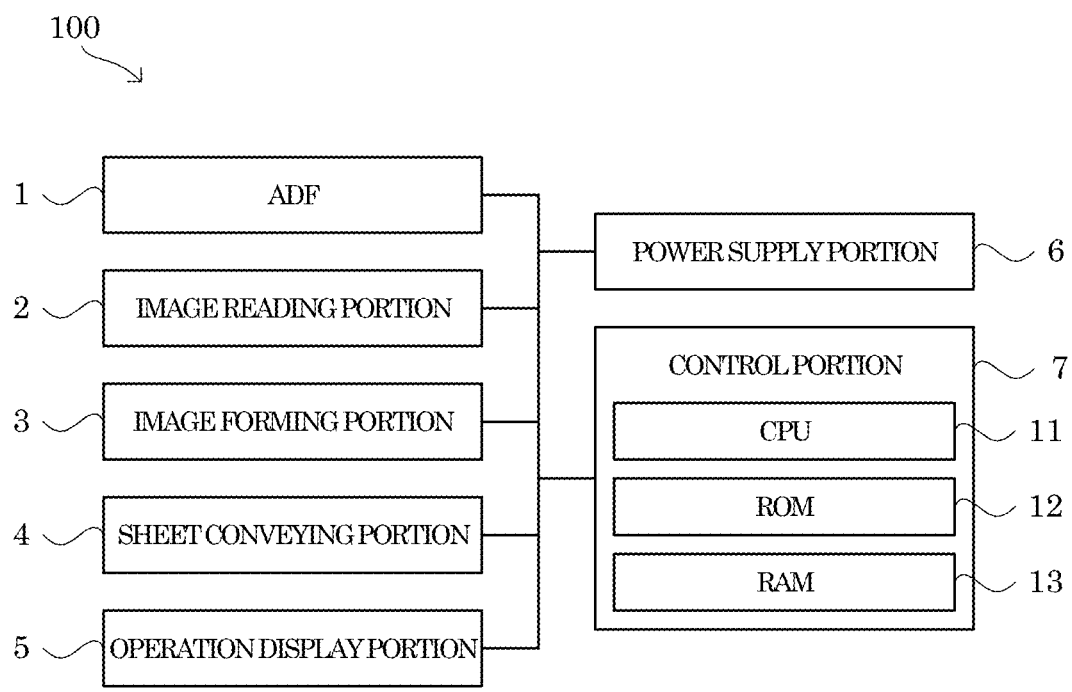
FIG. 2 is a block diagram showing a system configuration of the image forming apparatus according to the embodiment of the present disclosure.

As shown in FIG. 1 and FIG. 2, the image forming apparatus 100 includes an auto document feeder (ADF) 1, an image reading portion 2, an image forming portion 3, a sheet conveying portion 4, an operation display portion 5, a power supply portion 6, and a control portion 7.

The ADF 1 conveys a document sheet to be read by the scan function. The ADF 1 includes a document sheet loading portion, a plurality of conveying rollers, a document sheet holder, and a sheet discharge portion.

The image reading portion 2 implements the scan function. The image reading portion 2 includes a document sheet table, a light source, a plurality of mirrors, an optical lens, and a charge coupled device (CCD).

The image forming portion 3 implements the print function. Specifically, the image forming portion 3 forms an image on a sheet using electrophotography. The image forming portion 3 includes a photoconductor drum, a charging device, a laser scanning unit (LSU), a developing device, a transfer device, a cleaning device, and a fixing device.

The sheet conveying portion 4 conveys a sheet on which an image is formed by the image forming portion 3. The sheet conveying portion 4 includes a sheet feed cassette and a plurality of conveying rollers.

The operation display portion 5 is a user interface of the image forming apparatus 100. The operation display portion 5 includes a display portion and an operation portion. The display portion displays various types of information in response to control instructions from the control portion 7. The display portion is, for example, a liquid crystal display. The operation portion inputs various types of information to the control portion 7 in response to user operations. For example, the operation portion is a touch panel.

The power supply portion 6 supplies power supplied from an external commercial power source 200 (see FIG. 3) to the control portion 7.

The control portion 7 performs overall control of the image forming apparatus 100. As shown in FIG. 2, the control portion 7 includes a CPU 11, a ROM 12, and a RAM 13. The CPU 11 is a processor that executes various arithmetic processes. The ROM 12 is a nonvolatile storage device in which information such as control programs for causing the CPU 11 to execute various processes are stored in advance. The RAM 13 is a volatile or nonvolatile storage device used as a temporary storage memory (work area) for various processes executed by the CPU 11. The CPU 11 performs overall control of the image forming apparatus 100 by executing various control programs stored in the ROM 12 in advance.

[Configuration of Power Supply Portion 6] Next, a configuration of the power supply portion 6 will be described with reference to FIG. 3 and FIG. 4. It is noted that the image forming apparatus 100 is indicated by a dash-dot-dot-dash line in FIG. 3. In addition, in FIG. 3, electric signals input to and output from a power supply control portion 23 are indicated by dash-dot-dash lines with arrows.

Figure 3:
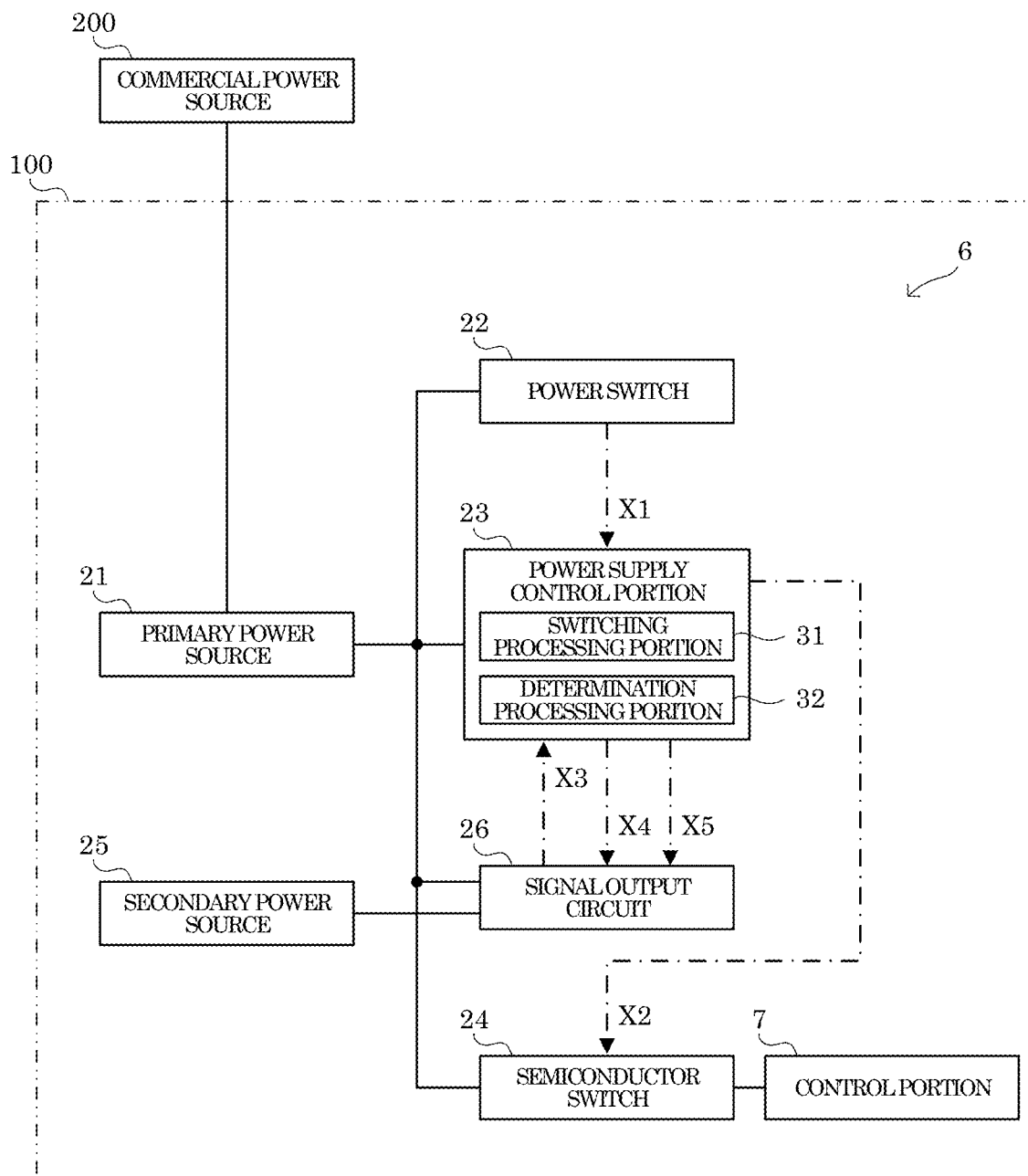
FIG. 3 is a block diagram showing a configuration of a power supply portion of the image forming apparatus according to the embodiment of the present disclosure.

As shown in FIG. 3, the power supply portion 6 includes a primary power source 21, a power switch 22, a power supply control portion 23, a semiconductor switch 24, a secondary power source 25, and a signal output circuit 26.

The primary power source 21 receives power supply from the commercial power source 200. Specifically, the primary power source 21 is an AC-DC converter that converts a 100V AC voltage supplied from the commercial power source 200 into a DC voltage of a predetermined voltage value. Power output from the primary power source 21 is supplied to the power switch 22, the power supply control portion 23, the signal output circuit 26, and the control portion 7. The commercial power source 200 is an example of the external power source of the present disclosure.

The power switch 22 is used to turn on the power of the image forming apparatus 100. Specifically, the power switch 22 outputs an electric signal X1 (see FIG. 3) in response to a user operation. For example, the power switch 22 is a so-called push type switch.

The power supply control portion 23 detects a user operation on the power switch 22. In addition, the power supply control portion 23 switches on or off the power supply to the control portion 7 when a user operation on the power switch 22 is detected. Specifically, when the electric signal X1 is input from the power switch 22, the power supply control portion 23 detects a user operation on the power switch 22. In addition, the power supply control portion 23 switches on or off the output of an electric signal X2 (see FIG. 3) to the semiconductor switch 24 every time a user operation on the power switch 22 is detected. For example, the power supply control portion 23 is constituted by an electronic circuit such as an integrated circuit (ASIC).

The semiconductor switch 24 is provided on a power supply path from the primary power source 21 to the control portion 7. The semiconductor switch 24 switches between conduction and interruption of the power supply path in accordance with the presence or absence of the input of the electric signal X2 from the power supply control portion 23. For example, the semiconductor switch 24 is a field effect transistor (FET).

The control portion 7 switches on or off the power supply from the primary power source 21 in response to detection of an operation on the power switch 22. Hereinafter, the state of the image forming apparatus 100 in which the control portion 7 is receiving power from the primary power source 21 will be referred to as a "power-on state". In addition, the state of the image forming apparatus 100 in which the control portion 7 is not receiving power from the primary power source 21 will be referred to as a "power-off state".

By the way, in the image forming apparatus 100, the power supply from the commercial power source 200 may temporarily stop due to power failure or the like when the image forming apparatus 100 is in the power-on state. In this case, it is desired that when the power supply from the commercial power source 200 is resumed, the power supply to the control portion 7 is also resumed.

On the other hand, in the image forming apparatus 100, the power supply from the commercial power source 200 may temporarily stop also when the image forming apparatus 100 is in the power-off state. In this case, it is desired to continue the state in which the power supply to the control portion 7 is stopped even after the power supply from the commercial power source 200 is resumed.

In contrast, a possible configuration is to provide a nonvolatile storage portion in which state information indicating the state of power supply to the control portion 7 is stored, and to determine whether or not to execute power supply to the control portion 7 based on the state information stored in the storage portion when power supply from the commercial power source 200 is resumed.

However, with the configuration including the storage portion, it is necessary to execute a process of reading the state information from the storage portion when power supply from the commercial power source 200 is resumed, and it takes time to determine whether or not to execute power supply to the control portion 7.

On the other hand, in the image forming apparatus 100 according to the embodiment of the present disclosure, as will be described below, it is possible to determine whether or not to execute power supply to the control portion 7 in a short time at the start of power supply from the outside.

The secondary power source 25 supplies power to the signal output circuit 26. For example, the secondary power source 25 supplies power only to the signal output circuit 26. The secondary power source 25 outputs a lower voltage than the primary power source 21. For example, the secondary power source 25 is a dry cell battery. It is noted that the secondary power source 25 may be a storage battery that is charged by receiving power from the primary power source 21.

While the primary power source 21 is receiving power supply from the commercial power source 200, the signal output circuit 26 receives power supply from the primary power source 21 and outputs a preset digital signal X3 (see FIG. 3). In addition, while the power supply from the commercial power source 200 to the primary power source 21 is stopped, the signal output circuit 26 receives power supply from the secondary power source 25 and outputs the digital signal X3.

Figure 4:
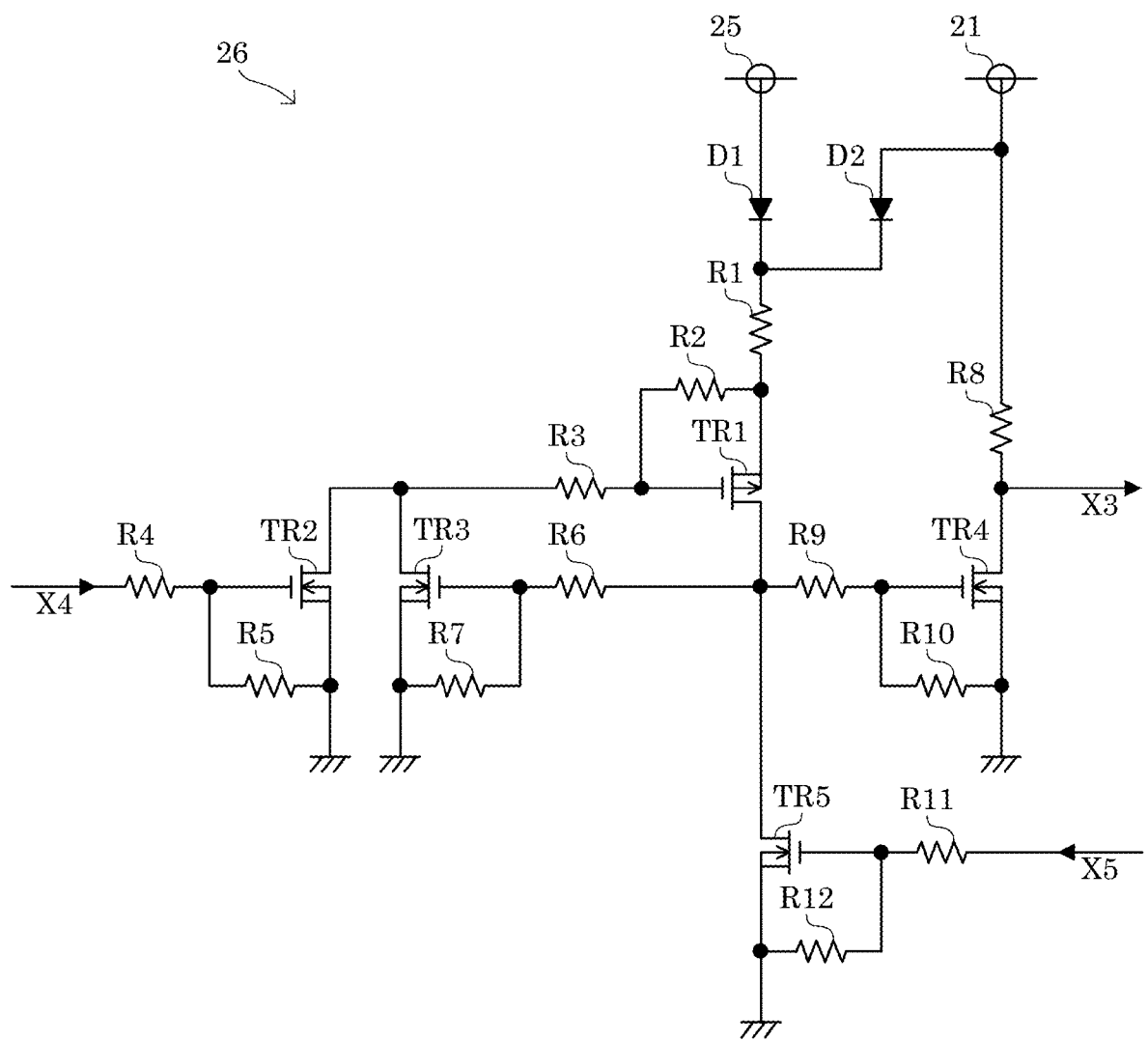
FIG. 4 is a circuit diagram showing a configuration of a signal output circuit of the image forming apparatus according to the embodiment of the present disclosure.

As shown in FIG. 4, the signal output circuit 26 includes transistors TR1 to TR5, resistors R1 to R12, and diodes D1 to D2.

The transistor TR1 is a P-channel metal oxide semiconductor field effect transistor (MOSFET). As shown in FIG. 4, the source terminal of the transistor TR1 is connected to the secondary power source 25 via the resistor R1 and the diode D1. The diode D1 has an anode terminal connected to the secondary power source 25 and a cathode terminal connected to the resistor R1. In addition, the source terminal of the transistor TR1 is connected to the primary power source 21 via the resistor R1 and the diode D2. The diode D2 has an anode terminal connected to the primary power source 21 and a cathode terminal connected to the resistor R1. In addition, the source terminal of the transistor TR1 is connected to the gate terminal of the transistor TR1 via the resister R2. The gate terminal of the transistor TR1 is connected to the drain terminal of the transistor TR2 and the drain terminal of the transistor TR3 via the resistor R3. The drain terminal of the transistor TR1 is connected to the gate terminal of the transistor TR3 via the resistor R6. In addition, the drain terminal of the transistor TR1 is connected to the gate terminal of the transistor TR4 via the resister R9. In addition, the drain terminal of the transistor TR1 is connected to the drain terminal of the transistor TR5.

The transistor TR2 is an N-channel MOSFET. As shown in FIG. 4, the source terminal of the transistor TR2 is connected to the ground. In addition, the source terminal of the transistor TR2 is connected to the gate terminal of the transistor TR2 via the resister R5. The gate terminal of the transistor TR2 is connected to the signal line of a digital signal X4 (see FIG. 3 and FIG. 4) via the resistor R4. The drain terminal of the transistor TR2 is connected to the gate terminal of the transistor TR1 via the resistor R3. In addition, the drain terminal of the transistor TR2 is connected to the drain terminal of the transistor TR3.

The transistor TR3 is an N-channel MOSFET. As shown in FIG. 4, the source terminal of the transistor TR3 is connected to the ground. In addition, the source terminal of the transistor TR3 is connected to the gate terminal of the transistor TR3 via the resister R7. The gate terminal of the transistor TR3 is connected to the drain terminal of the transistor TR1 via the resistor R6. In addition, the gate terminal of the transistor TR3 is connected to the gate terminal of the transistor TR4 via the resister R6 and the resistor R9. In addition, the gate terminal of the transistor TR3 is connected to the drain terminal of the transistor TR5 via the resister R6. The drain terminal of the transistor TR3 is connected to the gate terminal of the transistor TR1 via the resistor R3. In addition, the drain terminal of the transistor TR3 is connected to the drain terminal of the transistor TR2.

The transistor TR4 is an N-channel MOSFET. As shown in FIG. 4, the source terminal of the transistor TR4 is connected to the ground. In addition, the source terminal of the transistor TR4 is connected to the gate terminal of the transistor TR4 via the resister R10. The gate terminal of the transistor TR4 is connected to the drain terminal of the transistor TR1 via the resistor R9. In addition, the gate terminal of the transistor TR4 is connected to the gate terminal of the transistor TR3 via the resister R9 and the resistor R6. In addition, the gate terminal of the transistor TR4 is connected to the drain terminal of the transistor TR5 via the resister R9. The drain terminal of the transistor TR4 is connected to the primary power source 21 via the resistor R8. In addition, the drain terminal of the transistor TR4 is connected to the signal line of the digital signal X3 (see FIG. 3 and FIG. 4).

The transistor TR5 is an N-channel MOSFET. As shown in FIG. 4, the source terminal of the transistor TR5 is connected to the ground. In addition, the source terminal of the transistor TR5 is connected to the gate terminal of the transistor TR5 via the resister R12. The gate terminal of the transistor TR5 is connected to the signal line of a digital signal X5 (see FIG. 3 and FIG. 4) via the resistor R11. The drain terminal of the transistor TR5 is connected to the drain terminal of the transistor TR1. In addition, the drain terminal of the transistor TR5 is connected to the gate terminal of the transistor TR3 via the resister R6. In addition, the drain terminal of the transistor TR5 is connected to the gate terminal of the transistor TR4 via the resister R9.

The signal output circuit 26 transitions between a first state and a second state. The first state is a state in which all of the transistors TR1 to TR5 are in the OFF state. In the first state, a high-level digital signal X3 is output. In the second state, the transistor TR1, the transistor TR3, and the transistor TR4 are in the ON state, and the transistor TR2 and the transistor TR5 are in the OFF state. In the second state, a low-level digital signal X3 is output.

Specifically, when the signal output circuit 26 is in the first state with a low-level digital signal X4 input and a low-level digital signal X5 input and the signal level of the digital signal X4 is temporarily switched to the high level, the signal output circuit 26 transitions to the second state. More specifically, in the signal output circuit 26, when the signal level of the digital signal X4 is switched to the high level, the transistor TR2 is turned on. As a result, the transistors TR1, TR3, and TR4 are turned on. When the signal level of the digital signal X4 is returned to the low level, the transistor TR2 is turned off, and the state transition to the second state is completed.

In addition, when the signal output circuit 26 is in the second state with a low-level digital signal X4 input and a low-level digital signal X5 input and the signal level of the digital signal X5 is temporarily switched to the high level, the signal output circuit 26 transitions to the first state. More specifically, in the signal output circuit 26, when the signal level of the digital signal X5 is switched to the high level, the transistor TR5 is turned on. As a result, the transistors TR1, TR3, and TR4 are turned off. When the signal level of the digital signal X5 is returned to the low level, the transistor TR5 is turned off, and the state transition to the first state is completed.

In addition, when the signal output circuit 26 is in the first state or the second state and the signal levels of the digital signal X4 and the digital signal X5 are maintained at the low level, the signal output circuit 26 maintains the current state.

As shown in FIG. 3, the power supply control portion 23 includes a switching processing portion 31 and a determination processing portion 32.

The switching processing portion 31 switches the signal level of the digital signal X3 when the power supply state of the control portion 7 is switched.

Specifically, the switching processing portion 31 switches the signal level of the digital signal X3 from a high level (an example of the first level of the present disclosure) to a low level (an example of the second level of the present disclosure) when the power supply to the control portion 7 is started (when transitioning to the power-on state).

More specifically, the switching processing portion 31 temporarily switches the signal level of the digital signal X4 input to the signal output circuit 26 to the high level when the power supply to the control portion 7 is started. Thus, the signal output circuit 26 transitions from the first state to the second state, and the digital signal X3 output by the signal output circuit 26 is switched from the high level to the low level.

The switching processing portion 31 switches the signal level of the digital signal X3 from the low level to the high level when the power supply to the control portion 7 is stopped (when transitioning to the power-off state).

More specifically, the switching processing portion 31 temporarily switches the signal level of the digital signal X5 input to the signal output circuit 26 to the high level when the power supply to the control portion 7 is stopped. Thus, the signal output circuit 26 transitions from the second state to the first state, and the digital signal X3 output by the signal output circuit 26 is switched from the low level to the high level.

In addition, when the power supply state of the control portion 7 is switched, the switching processing portion 31 maintains the signal level of the digital signal X3 until the next switching timing of the power supply state of the control portion 7.

More specifically, the switching processing portion 31 maintains the signal level of the digital signal X4 input to the signal output circuit 26 at the low level, and maintains the signal level of the digital signal X5 at the low level. Thus, the state of the signal output circuit 26 is maintained in either the first state or the second state as long as the power supply from the commercial power source 200 to the primary power source 21 is continued.

It is noted that, when the signal output circuit 26 is in the second state, even if the power supply from the commercial power source 200 to the primary power source 21 is stopped and the power supply from the primary power source 21 to the signal output circuit 26 is stopped, the secondary power source 25 supplies power to the signal output circuit 26 instead of the primary power source 21, so that the second state (the state in which the transistor TR1, the transistor TR3, and the transistor TR4 are in the ON state) of the signal output circuit 26 is maintained.

When the power supply from the commercial power source 200 to the primary power source 21 is started, the determination processing portion 32 determines whether or not to execute the power supply to the control portion 7 based on the signal level of the digital signal X3 output by the signal output circuit 26.

Specifically, the determination processing portion 32 determines the signal level of the digital signal X3 output by the signal output circuit 26 when it is activated by receiving power from the primary power source 21.

When the signal level of the digital signal X3 is the high level, that is, when the power supply from the commercial power source 200 is stopped due to power failure or the like while the power supply to the control portion 7 is stopped, the determination processing portion 32 determines not to execute the power supply to the control portion 7. In this case, the power supply stop state of the control portion 7 is maintained until the power switch 22 is operated by the user.

When the signal level of the digital signal X3 is the low level, that is, when the power supply from the commercial power source 200 is stopped due to power failure or the like while the power supply to the control portion 7 is executed, the determination processing portion 32 determines to execute the power supply to the control portion 7. In this case, the power supply control portion 23 inputs the electric signal X2 (see FIG. 3) to the semiconductor switch 24 to start power supply to the control portion 7 by the primary power source 21.

Here, in the signal output circuit 26, the transistors TR1, TR3, and TR4 are turned on and current flows while the low-level digital signal X3 is being output, and all of the transistors TR1 to TR5 are turned off and current does not flow while the high-level digital signal X3 is being output. In addition, when the image forming apparatus 100 is in the power-off state, a high level digital signal X3 is output from the signal output circuit 26. Therefore, as compared with the configuration in which a low-level digital signal X3 is output from the signal output circuit 26 when the image forming apparatus 100 is in the power-off state, the power consumption of the secondary power source 25 can be avoided when the power plug of the image forming apparatus 100 is pulled out from the outlet of the commercial power source 200 when the image forming apparatus 100 is in the power-off state.

As described above, in the image forming apparatus 100, when the power supply from the commercial power source 200 to the primary power source 21 is started, it is determined whether or not to execute the power supply to the control portion 7 based on the signal level of the digital signal X3 output by the signal output circuit 26. Thus, as compared with the configuration including the storage portion, it is possible to shorten the time required for determining whether or not to execute the power supply to the control portion 7 because it is not necessary to execute the process of reading the state information from the storage portion when the power supply from the commercial power source 200 is resumed. Accordingly, it is possible to determine whether or not to execute the power supply to the control portion 7 in a short time at the start of power supply from the outside.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An electronic apparatus comprising:
    a primary power source configured to receive power supply from an external power source;
    a control portion configured to switch on or off power supply from the primary power source in response to detection of an operation on a predetermined power switch;
    a signal output circuit configured to receive power supply from the primary power source and output a preset digital signal during power supply from the external power source to the primary power source, and receive power supply from a predetermined secondary power source and output the digital signal during power supply stop from the external power source to the primary power source;
    a switching processing portion configured to switch a signal level of the digital signal when a power supply state of the control portion is switched; and
    a determination processing portion configured to determine whether or not to execute power supply to the control portion based on the signal level of the digital signal output by the signal output circuit when power supply from the external power source to the primary power source is started.

2. The electronic apparatus according to claim 1, wherein in the signal output circuit, no current flows during output of the digital signal at a first level, and a current flows during output of the digital signal at a second level,
    the switching processing portion switches the signal level of the digital signal from the first level to the second level when the power supply to the control portion is started.

3. The electronic apparatus according to claim 1, further comprising one or both of an image reading portion configured to read an image of a document sheet and an image forming portion configured to form an image based on image data.

* * * * *